United States Patent [19]

Abe et al.

[11] Patent Number: 4,626,976
[45] Date of Patent: Dec. 2, 1986

[54] SWITCH MODE POWER SUPPLY HAVING MAGNETICALLY CONTROLLED OUTPUT

[75] Inventors: Kozin Abe; Kenichi Onda, both of Hitachi; Kohei Yabuno, Mito; Shin Nakajima, Kumagaya; Noboru Ogawa, Hitachi, all of Japan

[73] Assignees: Hitachi, Ltd.; Hitachi Metals, Ltd., both of Tokyo, Japan

[21] Appl. No.: 694,060

[22] Filed: Jan. 23, 1985

[30] Foreign Application Priority Data

Jan. 23, 1984 [JP] Japan .............................. 59-8577
Jan. 23, 1984 [JP] Japan .............................. 59-8578

[51] Int. Cl.$^4$ ........................................... H02M 3/335
[52] U.S. Cl. .................................... 363/19; 363/75; 363/91
[58] Field of Search ................. 363/18, 19, 75, 82, 363/90, 91

[56] References Cited

U.S. PATENT DOCUMENTS

| | | | |
|---|---|---|---|
| 3,048,767 | 8/1962 | Smeltzer | 363/91 |
| 4,451,876 | 5/1984 | Ogata | 363/91 |
| 4,460,955 | 7/1984 | Hattori et al. | 363/91 |

OTHER PUBLICATIONS

"Design Considerations in Multi-Output DC–DC Converter with Magnetic Amplifiers," Koyashiki, T., IEEE, CH 1855-6, pp. 388-394.

Primary Examiner—Patrick R. Salce
Assistant Examiner—Anita M. Ault
Attorney, Agent, or Firm—Antonelli, Terry & Wands

[57] ABSTRACT

A magnetically controlled switching regulator which controls an output voltage using a saturable reactor, wherein the saturable reactor is constituted by a first winding through which an output current flows and a second winding through which a reset current flows. The energy for resetting the saturable reactor is supplied from a capacitor in a smoothing circuit for an output voltage. A turn ratio between the first and second windings is set so that a sufficiently high reset voltage is obtained. Since the reset current of the saturable reactor does not flow through a transformer, the saturation of the transformer and a high increase in temperature thereof do not occur, so that the core of the transformer can be miniaturized and a high gain of the output voltage control circuit can be derived.

25 Claims, 17 Drawing Figures

SWITCH MODE POWER SUPPLY HAVING MAGNETICALLY CONTROLLED OUTPUT

The present invention relates to a switch mode power supply having a magnetically controlled output and, more particularly, to a switch mode power supply having a magnetically controlled output which is provided with a circuit arrangement which makes it possible to completely reset a transformer of a switching regulator.

As one method of regulating an output of a switching regulator, a magnetically controlling method using a saturable reactor has been known. This method is an output control method using no semiconductor switch and has features such that the electric power loss is low and the parts count can be reduced as compared with the chopper control method and dropper control method.

However, the switching regulator of the magnetically controlling method (hereinbelow, referred to as the magnetically controlled switching regulator) has the following problems. (1) An increase in temperature of the transformer is large as compared with other methods. (2) There is a case where a switching element, for example, a transister is broken when a load suddenly changes (this transistor is a switching element which is connected in series with the primary winding of the transformer and turns on and off the DC voltage that is applied to the transformer, thereby converting it to an AC pulse voltage).

Conventionally, in order to solve these problems, there have been taken measures such as enlarging the volume of the core of the transformer to suppress the increase in temperature of the transformer, providing an airgap in the core, lowering the gain or transient response characteristic of a control circuit of a saturable reactor to thereby prevent an increase in reset current of the saturable reactor when the load suddenly changes, or the like. However, these measures obstruct the miniaturization of the switching regulator and cause the deterioration of output accuracy.

Reference may be made to "DESIGN CONSIDERATION IN MULTI-OUTPUT DC-DC CONVERTER WITH MAGNETIC AMPLIFIES" written by T. Koyashiki et al of Musashino Electrical Communication Laboratory, N.T.T. Japan, published on Oct. 18, 1983.

Accordingly, it is an object of the present invention to provide a magnetically controlled switching regulator which overcomes the above-mentioned problems in the conventional technology.

A further specific object of the invention is to provide a magnetically controlled switching regulator in which the transformer can be completely reset.

According to one aspect of the present invention, in a magnetically controlled switching regulator which is constructed such that a DC power supply, a primary winding of a transformer and a switching transistor are connected in series with each other, that a saturable reactor for the magnetic control, a rectifier and a smoothing circuit, namely, an L-C filter constituted by a choke coil and a capacitor are connected to a secondary winding of this transformer, and that a voltage which is generated in the secondary winding of the transformer by the on-off operation of the switching transistor is controlled to a constant output voltage by the above-mentioned reactor, resetting of the reactor is made at a high voltage using the energy stored in the L-C filter without using the exciting energy stored in the transformer.

According to another aspect of the present invention, in a magnetically controlled switching regulator which is constructed such that a DC power supply, a primary winding of a transformer and a switching transistor are connected in series with each other, that a saturable reactor for magnetic control, a diode for rectification and a smoothing circuit constituted by a choke coil and a capacitor are connected to the secondary side of this transformer, and that a voltage which is outputted in a secondary winding of the transformer by the on-off operation of the switching transistor is controlled to a constant output voltage by the reactor, the reactor is constituted by a first winding which allows an output current from the secondary winding of the transformer to flow therethrough and a second winding which is magnetically coupled to the first winding and is connected to the capacitor in the smoothing circuit, whereby the reset current of the saturable reactor is allowed to flow through the second winding by the energy stored in the capacitor.

According to still another aspect of the present invention, in a magnetically controlled switching regulator which is constructed such that a DC power supply, a primary winding of a transformer and a switching transistor are connected in series with each other, that a saturable reactor for magnetic control, a diode for rectification and a smoothing circuit constituted by a choke coil and a capacitor are connected to the secondary side of this transformer, and that a voltage generated in a secondary winding of the transformer by the on-off operation of the switching transistor is controlled to a constant output voltage by the reactor for magnetic control, the choke coil in the smoothing circuit is provided with a winding which allows a current which is outputted from a secondary winding of the transformer to flow therethrough and another separate winding which is magnetically coupled to that winding so that the reset current of the saturable reactor is obtained from the above-mentioned separate winding of the choke coil using the energy stored in the choke coil.

According to still another aspect of the present invention, in a magnetically controlled switching regulator which is constructed such that a DC power supply, a primary winding of a transformer and a switching transistor are connected in series with each other, that a saturable reactor for magnetic control, a diode for rectification and a smoothing circuit constituted by a choke coil and a capacitor are connected to the secondary side of this transformer, and that a voltage outputted in a secondary winding of the transformer by the on-off operation of the switching transistor is controlled to a constant output voltage by the reactor, the choke coil in the smoothing circuit is provided with a winding which allows a current which is outputted from a secondary winding of the transformer to flow therethrough and another separate winding which is magnetically coupled to that winding and is connected in series with the capacitor in the smoothing circuit and with the reactor for magnetical control, whereby the reset current for the reactor is obtained using the energies stored in the choke coil and capacitor in the smoothing circuit.

The above and other objects, features and advantages of the present invention will be apparent from the following detailed description of the preferred embodiments of the present invention in conjunction with the accompanying drawings, in which.

Prior to explaining embodiments of the present invention, a conventional magnetically controlled switching regulator will be further described in detail with reference to FIGS. 1 to 3.

Figure 1:
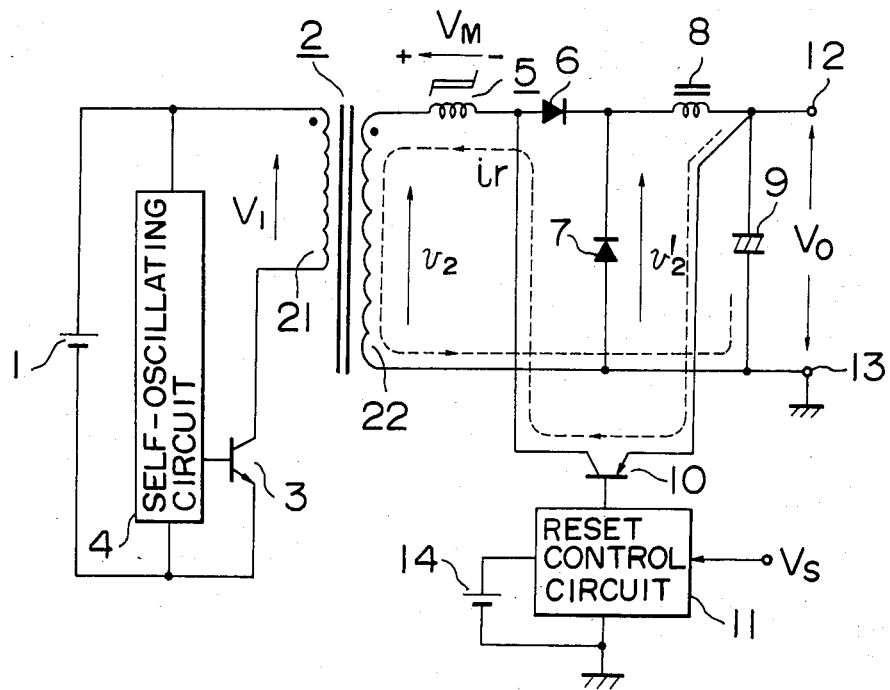
FIG. 1 is a diagram showing an example of a circuit of a conventional magnetically controlled switching regulator.

FIG. 1 shows one example of a prior art magnetically controlled switching regulator.

In the figure, an output on the positive polarity side of an unregulated DC power supply 1 is connected to one end (the dotted end side) of a primary winding 21 of a transformer 2, while the other end of the primary winding 21 of the transformer 2 is connected to a collector of a transistor 3. An emitter of the transistor 3 is connected to an output on the negative side of the DC power supply 1, while a base thereof is connected to an output of a self-oscillating circuit 4. The self-oscillating circuit 4 turns the transistor 3 on and off at a predetermined frequency. One end (the dotted side) of a secondary winding 22 of the transformer 2 is connected to an anode of a rectifying diode 6 through a saturable reactor 5, while a cathode thereof is connected to one end of a choke coil 8. The other end of the choke coil 8 is connected to an positive polarity output terminal 12. A capacitor 9 is connected between the positive side output terminal 12 and a negative side output terminal 13. The capacitor 9 and choke coil 8 form a smoothing circuit, namely, an L-C filter. A cathode of a diode 7 is connected to the cathode of the diode 6, while an anode of the diode 7 is connected to the negative side output terminal 13. The other end of the secondary winding 22 of the transformer 2 is connected to the negative polarity output terminal 13. An emitter of a transistor 10 for controlling the reset of the saturable reactor 5 is connected to the positive side output terminal 12 and a collector thereof is connected to a connecting point of the saturable reactor 5 and the anode of the diode 6, while a base thereof is connected to an output of a reset control circuit 11. The reset control circuit 11 operates by a power source which is supplied from an auxiliary power source 14 connected thereto. Also, an output voltage $V_0$ is applied as a sense voltage $v_s$ to the reset control circuit 11. The output voltage $V_0$ may be used as the auxiliary power supply.

The operation of the above-mentioned switching regulator will then be described. When the transistor 3 is turned on, a voltage $V_1$ is applied to the primary winding 21 of the transformer 2 and a voltage $v_2$ is similarly induced in the secondary winding 22 which is positive at the dotted end thereof. At this time, since the saturable reactor has been preliminarily magnetized by a reset current $i_r$ so as to have a certain magnetic flux density lower than the saturation magnetic flux density, the saturable reactor 5 has a voltage the polarity of which is as shown in the drawing, thereby blocking the voltage $v_2$.

Namely, the saturable reactor 5 which serves as a switch has a high impedance which corresponds to a state in which the switch is turned off. After the transistor 3 is turned on and when the saturable reactor 5 is magnetized to reach the saturation region by the voltage $v_2$ as the time elapses, the switch is turned on, thereby allowing an electric power to be supplied to a load. This path starts from the positive polarity side (the dotted end) of the secondary winding 22 and through the saturable reactor 5, diode 6, choke coil 8, and capacitor 9 and ends at the negative polarity side of the winding 22. In order to stabilize and make the output voltage $V_0$ constant, the voltage $V_0$ is applied as the detection signal $v_s$ to the reset control circuit 11, thereby controlling the reset current $i_r$.

The operation of the saturable reactor 5 will be explained in detail with reference to FIGS. 1 to 3.

In FIG. 1, the reset control circuit 11 permits the reset current $i_r$ responsive to the output voltage $V_0$ to flow through the secondary winding 22 of the transformer 2 along the path indicated by the broken line in the figure during the OFF-state interval of the switching transistor 3. The saturable reactor 5 is magnetized with this reset current $i_r$.

Figure 2:
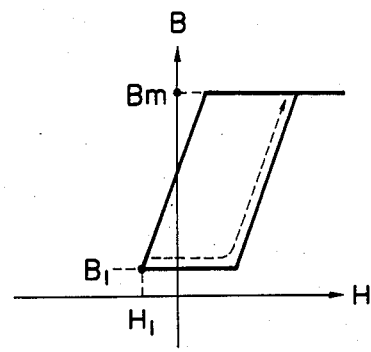
FIGS. 2 to 4 are diagrams useful in explaining the operation of the conventional magnetically controlled switching regulator.
Figure 3:
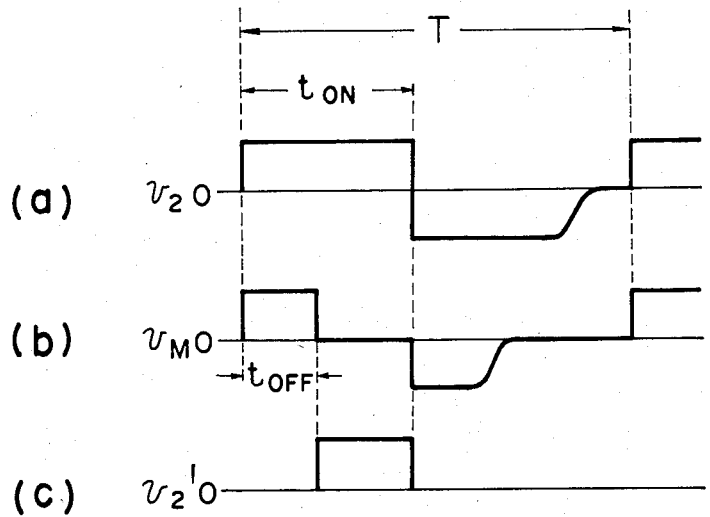

FIG. 2 is a diagram showing a magnetization curve of the saturable reactor, in which the ordinate indicates a magnetic flux density B and the abscissa represents a magnetic field H. FIG. 3 is a diagram showing a voltage waveform of each section of the circuit shown in FIG. 1. The intensity $H_1$ of the magnetic field of the reactor 5 caused by the current $i_r$ is expressed by the following equation.

$$H_1 = \frac{i_r \cdot n}{l_L} \quad (AT/m) \quad (1)$$

where, n is the number of turns of the winding of the reactor 5 and $l_L$ is a length of magnetic path of the iron core of the reactor 5.

When the intensity of the magnetic field is $H_1$, the magnetic flux density of the reactor 5 is $B_1$ shown in FIG. 2. At this time, when the transistor 3 is turned on, the voltage $v_2$ as shown at (a) of FIG. 3 is induced in the secondary winding 22 which is positive at the dotted terminal during the interval ($t_{on}$) when the transistor 3 is in the ON state. This voltage is applied to the reactor 5, so that the magnetic flux density of the reactor 5 increases from $B_1$ taking a path indicated by a broken line in the direction indicated by arrows in FIG. 2 and reaches the maximum magnetic flux density $B_m$. Since the permeability of the reactor 5 is large until the magnetic flux density reaches from $B_1$ to $B_m$, the inductance is also large, so that a very small current flows through the reactor 5. However, after the magnetic flux density reached $B_m$, the permeability becomes small and the inductance decreases, so that the current flowing through the reactor 5 rapidly increases. Due to this, as shown at (b) of FIG. 3, after the transistor 3 was turned on, there appears the voltage $V_M$ across the reactor which voltage is equal to the voltage $V_2$, and the reactor 5 blocks the voltage $v_2$ until the magnetic flux density reaches $B_m$. However, when the magnetic flux density reaches $B_m$, the reactor 5 cannot block the voltage $v_2$ any longer, so that a voltage $v_2'$ voltage of which is almost equal to that of $V_2$ is developed on the output side of the reactor 5 as shown at (c) of FIG. 3, thereby causing an electric power to be supplied to the load.

The interval $t_{off}$ during which the reactor can block the voltage $v_2$ is expressed by the following equation.

$$t_{off} = \frac{n \cdot s \cdot (B_m - B_1)}{v_2} \quad (S) \tag{2}$$

In equation (2), S is a cross sectional area of the iron core of the reactor 5. It will be understood that $t_{off}$ varies by changing $B_1$ from equation (2) and that $B_1$ can be changed by controlling $i_r$ from equation (1) and FIG. 2.

As described above, in the magnetically controlled switching regulator, by changing $i_r$ in dependence upon the output voltage of the switching regulator, the time length during which the voltage $v_2'$ is developed is controlled to thereby stabilize the output voltage. In FIG. 3 at (a), T represents one switching period. In the mean time, the negative voltage shown in FIG. 3 at (a) which is generated in the secondary winding of the transformer 2 during the OFF-state interval of the transistor 3 is the fly-back voltage which is generated during the interval in which the exciting energy of the transformer 2 is reset.

In the conventional magnetically controlled switching regulator represented by the above-mentioned circuit, there are drawbacks such that (1) an increase in temperature of the transformer is large and (2) there is a case where the transistor 3 is broken when the load suddenly changes, and the like as has been mentioned earlier.

The present inventors have determined the causes for those problems for the first time and solved them, and at the same time the inventors have invented a magnetically controlled switching regulator having other very useful effects.

Figure 4:
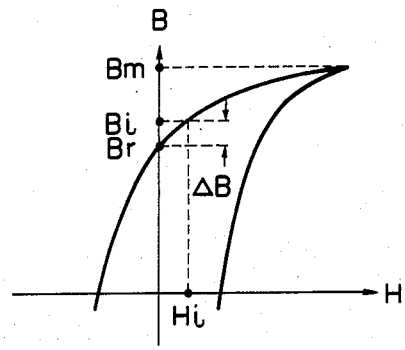

The causes for occurrence of the above-mentioned problems (1) and (2) will now be described hereinbelow with reference to FIGS. 1 and 4. FIG. 4 is a diagram showing a magnetization curve of the transformer, in which the ordinate indicates the magnetic flux density B and the abscissa shows the magnetic field H. In an ordinary forward-type switching regulator, when the transistor disposed on the primary side of the transformer is turned on, the magnetic flux density of the iron core for the transformer increases from a residual magnetic flux density $B_r$ to $B_m$. $B_m$ is the magnetic flux density which is determined by an ON-state interval $t_{on}$ of the transistor, DC input voltage E which is applied to the primary winding of the transformer, number of turns of the primary winding of the transformer, and cross sectional area S of the core of the transformer.

The circuit is designed such that when the transistor is turned off, the core magnetized to $B_m$ is reset to $B_r$ during the interval until the transistor is next turned on. Therefore, in the ordinary forward-type switching regulator, the magnetic flux density of the core for the transformer varies between $B_r$ and $B_m$.

In the magnetically controlled switching regulator shown in FIG. 1, the current $i_r$ flowing through the reactor 5 flows from the positive polarity of the capacitor 9 along the path including the transistor 10, reactor 5, secondary winding 22, and negative polarity of the capacitor 9. That is, the voltage to reset the reactor 5 is derived using both of the fly-back voltage of the transformer 2 (voltage $v_2$ which is developed in the secondary winding of the transformer 2 from the exciting energy of the transformer 2 stored during the $t_{on}$ interval shown in FIG. 3 at (3)) and the voltage of the capacitor 9. Since $i_r$ flows during the OFF-state interval of the transistor 3, the core of the transformer is magnetized to the intensity $H_1$ of the magnetic field shown by the following equation prior to the turn-on of the transistor 3 such that the dot in FIG. 1 is the positive polarity.

$$H_i = \frac{i_r \cdot n_2}{l_T} \tag{3}$$

where, $n_2$ is the number of turns of the secondary winding 22 of the transformer 2, and $l_T$ is a length of magnetic path of the core of the transformer 2.

As will be understood from equation (3), since the reset current $i_r$ exists, the magnetic flux density of the transformer cannot return to the residual magnetic flux density $B_r$ during the OFF-state interval of the transistor 3 and is reset only to the magnetic flux density $B_i$ corresponding to $H_i$. Namely, the complete reset of the transformer is not performed. Thus, when the transistor 3 is turned on, the magnetic flux density of the transformer increases from $B_i$. Consequently, the magnetically controlled switching regulator shown in FIG. 1 operates such that the magnetic flux density of the transformer is shifted so as to be increased by only $\Delta B$ shown in FIG. 4 as compared with other methods.

Further, in such a case where $i_r$ is increased so as to regulate the output of the switching regulator, $\Delta B$ shown in FIG. 4 further increases. In the case where the transistor 3 is turned on in this state, it sometimes occur that the transformer is saturated and an excessive current flows, so that the transistor 3 is broken.

As described above, it has been determined that the excessive increase in temperature of the transformer and the breakage of the transistor at the time of sudden change of the load in the magnetically controlled switching regulator are caused due to the magnetization of the transformer by the reset current of the reactor.

Figure 5:
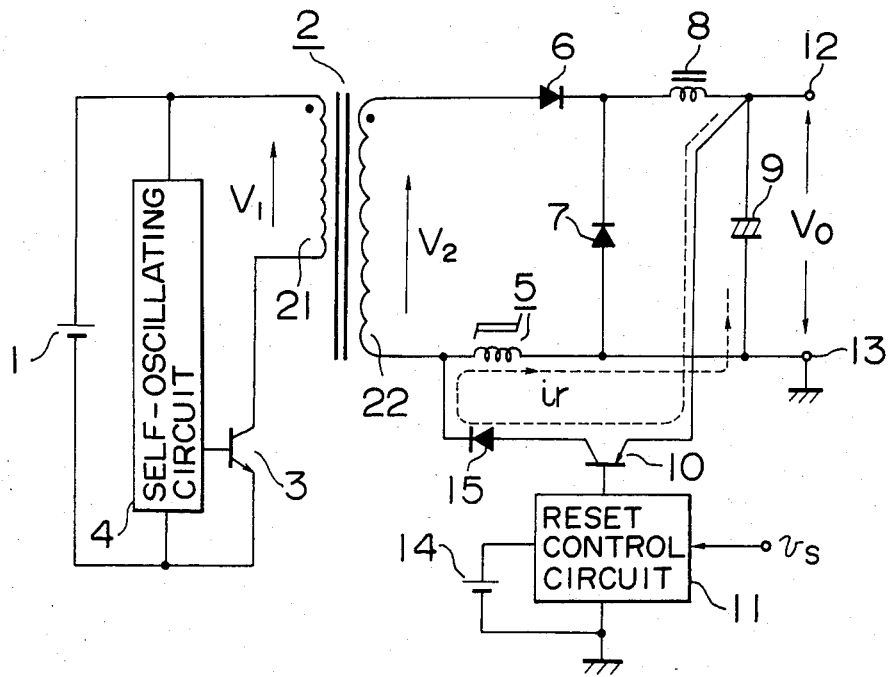
FIG. 5 is a circuit diagram of a magnetically controlled switching regulator which was conceived by the present inventors in the process of finally reaching the present invention.

Next, FIG. 5 shows a circuit diagram of a magnetically controlled regulator conceived by the present inventors in the course of finally reaching the present invention. The circuit of FIG. 5 will be first explained for the sake of an easy understanding of the present invention. In FIG. 5, the similar parts and components as those shown in FIG. 1 are designated by the same reference numerals and their detailed descriptions are omitted. In the conventional circuit shown in FIG. 1, the saturable reactor is provided on the positive polarity output terminal 12 (namely, at the end of the secondary winding of the transformer 2 which end is positive when the transistor 3 is turned on). However, in the circuit of FIG. 5, the saturable reactor is provided on the negative polarity output terminal 13, which is the difference from FIG. 1. In addition, due to this change of the position of the saturable reactor, the emitter of the transistor 10 to control the reset current is connected to the positive polarity output terminal 12 and the collector is connected through a diode 15 to the connecting point of the undotted end of the winding 22 of the transformer 2 and the saturable reactor 5, respectively. The other points are the same as FIG. 1.

In the conventional magnetically controlled switching regulator of FIG. 1, the saturable reactor is reset substantially by the fly-back voltage of the transformer using the energy of the capacitor of the smoothing circuit and the exciting energy of the transformer. Therefore, as mentioned above, the reset current of the saturable reactor flows through the secondary winding of the transformer and the transformer is magnetized prior to the turn-on of the switching transistor. Thus, for instance, if only the energy of the capacitor 9 is used without utilizing the exciting energy of the transformer, there is no need to allow the reset current $i_r$ of the saturable reactor to flow through the secondary winding of the transformer. Consequently, similarly to the switching regulators of other methods, the magnetic flux density of the transformer operates between $B_r$ and $B_m$ shown in FIG. 4. The circuit of FIG. 5 operates on the basis of such a principle. The saturable reactor is reset by the energy of the capacitor 9 and the reset current $i_r$ flows from the positive polarity terminal of the capacitor 9 along the path including the transistor 10, diode 15, saturable reactor 5, and negative polarity terminal of the capacitor 9 as indicated by the broken line and therefore, the reset current does not flow through the secondary winding of the transformer 2.

The circuit arrangement of FIG. 5, however, has the following problem. In the conventional arrangement shown in FIG. 1, when the switching transistor 3 is turned off, the transformer performs the resetting operation, and as a result by the fly-back voltage, the voltage is induced in the secondary winding 22 which is positive at the undotted end. Both of this voltage and the charge voltage of the capacitor 9, namely, the output voltage of the switching regulator can be used as the reset voltage of the saturable reactor 5. On the other hand, in the arrangement shown in FIG. 5, only the output voltage of the switching regulator can be used as the reset voltage of the saturable reactor 5. Therefore, there is a risk such that a voltage high enough to reset the saturable reactor 5 cannot be obtained.

This problem will then be described in detail. For instance, in a general switching regulator, the regulation of voltage is required in a wide load range from minimum output condition such as no load to the maximum output condition. However, in order to stabilize the output when a light load is applied in the magnetically controlled switching regulator, the output voltage $v_2$ of the secondary winding of the transformer has to be blocked during most of the turn-on interval of the switching transistor.

In this case, the saturable reactor has been magnetized by the voltage of $v_2$-$V_0$; therefore, when resetting the saturable reactor, if the saturable reactor is not magnetized by almost the same voltage as that voltage (i.e., $v_2$-$V_0$), the reset of the saturable reactor is not completed during the turn-off interval of the switching transistor, because the voltage time products when blocking and resetting operations have to be made equal.

In the meantime, generally speaking, in the output smoothing circuit of the choke input type, it is designed such that $v_2$ becomes a few times larger than $V_0$. For example, $v_2$ is about 20 V when the output voltage $V_0$ is 5 V, while it is about 60 V in the case of the output voltage of 12 V. In addition, it is designed such that the on-duty ratio is about 30% (maximum 50%) during the switching interval of the switching transistor. Therefore, in the method of using the output voltage $V_0$ or a voltage of the similar order as the voltage source to reset the saturable reactor, there occur problems such that it takes a long reset time commensurate with the low resetting voltage and stability of the output for a light load deteriorates.

Magnetically controlled switching regulators according to the present invention will then be described with reference to FIGS. 6 to 17, in which the similar parts and components as those shown in FIGS. 1 and 5 are designated by the same reference numerals and their descriptions are sometimes omitted.

Figure 6:
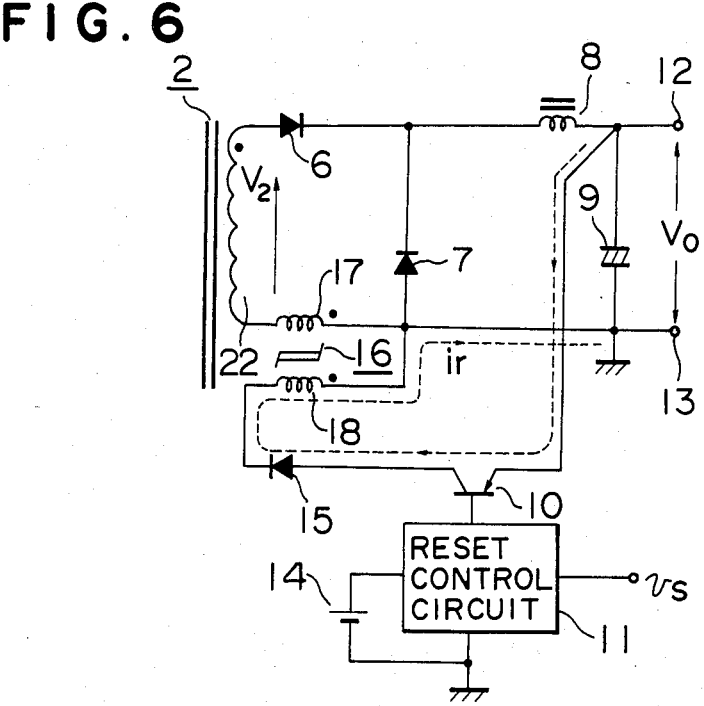
FIG. 6 is a circuit diagram showing one embodiment of a magnetically controlled switching regulator of the invention.

FIG. 6 is a circuit diagram of one embodiment of the present invention. In this diagram, one end (the dotted end) of the winding 22 of the transformer 2 is connected to the anode of the rectifying diode 6 and the cathode thereof is connected to the cathode of the diode 7 and also to one end of the choke coil 8. The other end of the choke coil is connected to the output terminal 12 on the positive polarity side. The capacitor 9 is connected between the positive polarity output terminal 12 and the negative polarity output terminal 13. The anode of the diode 7 is connected to the negative polarity output terminal 13. A saturable reactor 16 is constituted such that a second winding 18 for allowing the reset current $i_r$ to flow therethrough is magnetically coupled to a first winding 17 through which the output current flows. One end of the first winding 17 is connected to the other end (the undotted end) of the secondary winding 22 of the transformer 2. The other end (the dotted end) of the first winding 17 is connected to the negative polarity output terminal 13. One end of the second winding 18 is connected to the positive polarity output terminal 12 through the diode 15 and transistor 10, while the other end thereof (the dotted end) is connected to the negative polarity output terminal 13. In FIG. 6, the circuit on the primary side of the transformer 2 is similar to that in the conventional example of FIG. 1 or to that of FIG. 5; therefore, it is omitted.

In such an arrangement as described above, the reset current $i_r$ flows through the path indicated by a broken line in the diagram, namely, along the path of the positive polarity side of the capacitor 9→transistor 10→diode 15→second winding 18 of the saturable reactor 16→the negative polarity side of the capacitor 9, and does not pass through the secondary winding 22 of the transformer 2. The reset of the saturable reactor 16 will now be discussed. When the switching transistor 3 (refer to FIGS. 1 and 5) connected to the primary winding of the transformer 2 is in the OFF-state, the saturable reactor 16 is magnetized so as to be reset by the voltage of $$V_0 \times \frac{n_{M1}}{n_{M2}};$$

therefore, the turn ratio can be set such that a sufficiently high voltage is obtained. $n_{M1}$ and $n_{M2}$ respectively denote the numbers of turns of the first winding 17 and of the second winding 18 of the reactor 16. By selecting the turn ratio such that the voltage value is equal to almost $v_2$-$V_0$, the saturable reactor 16 can be completely reset within the turn-off interval even when the transistor 3 operates at the maximum onduty (normally, 50%).

Since the reset current $i_r$ of the order of tens to hundreds milliamperes (mA) flows through the second winding 18 which is provided for this resetting, the diameter of the second winding 18 may be chosen to be thin and the number of turns can be also set to about ½ to 1/5 of the first winding 17.

When the transistor 3 is turned off, a voltage is induced in the second winding 18 of the saturable reactor 16 due to the fly-back voltage, thereby applying the reverse bias to the controlling transistor 10; however, the diode 15 serves to block this reverse bias to thereby protect the transistor 10.

The reset control circuit 11 may be constituted by an ordinary control circuit in which the output voltage $V_0$ is inputted as the detection signal $v_s$ to an error amplifier and is compared with a reference voltage and a controlling element such as a transistor is controlled on the basis of the difference between them.

In the embodiment, the transformer can be perfectly reset without being affected by the reset current $i_r$ of the saturable reactor, so that the increase in temperature of the transformer is almost similar to those of the switching regulators such as a forward-type regulator or the like. Therefore, the transformer can be designed such that the core has the same volume as that of the core used in the forward-type regulator or the like. There is no need to lower the transient response characteristic of the control circuit 11 since the transformer can be perfectly reset. Also, the resetting of the saturable reactor can be assured even when a light load is applied. Thus, the control accuracy can be improved in accordance with the requirements and specifications of the power supply.

Figure 7:
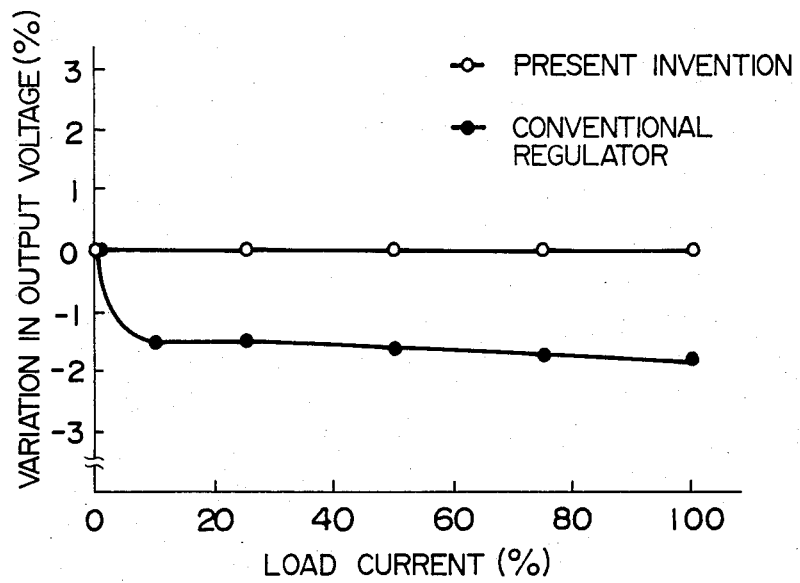
FIG. 7 is a diagram showing a comparison between the output characteristic of the magnetically controlled switching regulator of the embodiment of FIG. 6 and that of the conventional regulator.

FIG. 7 is a diagram showing the comparison between the output characteristic of the magnetically controlled switching regulator according to the embodiment and that of the conventional magnetically controlled switching regulator. In the conventional regulator, the control system is designed so that the saturation phenomenon of the transformer can be prevented when the load is suddenly changed from the maximum load to the minimum load. In the diagram, the ordinate denotes a variation (%) in output voltage and the abscissa indicates a load current (%). In this embodiment, it will be appreciated that good output voltage accuracy is derived over the whole range from a light load to the rated load. In addition to this fact, it has been confirmed that the output variation in the present invention was reduced to half of that in the conventional example even in case of the sudden change of load of 100%.

In the meantime, in addition to the foregoing advantages, the present embodiment has another advantage that is very useful to the magnetically controlled switching regulator in the conventional technology. This point will then be explained with reference to FIGS. 8 to 11. This advantage is such that the increase in temperature of the saturable reactor is less than that in the conventional method. According to an example of the actual measurement, when the saturable reactor using the core of the same material and same shape as the saturable reactor used in the magnetically controlled switching regulator based on the conventional method and using the winding of the same number of turns was used in the regulator according to the present invention, the temperature increase of the saturable reactor was about half of that of the conventional one. This will be explained hereinbelow.

Figure 8:
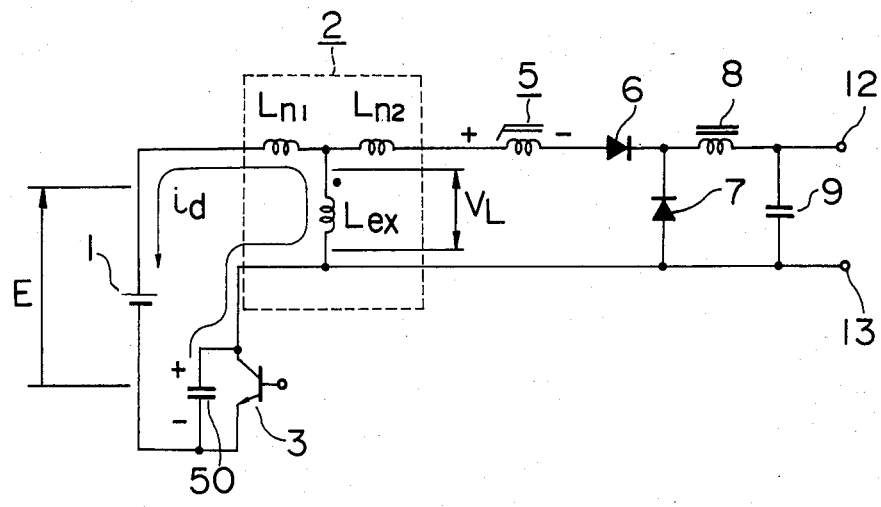
FIGS. 8 to 11 are diagrams useful in explaining one remarkably useful effect that is obtained according to the embodiment of FIG. 6.

FIG. 8 show a circuit of the conventional magnetically controlled switching regulator of FIG. 1 in which the transformer is shown as the equivalent circuit. In the equivalent circuit of the transformer, an exciting inductance $L_{ex}$ and leakage inductances $L_{n1}$ and $L_{n2}$ of the primary and secondary windings are shown, but other elements are omitted. A capacitor 50 is connected between the collector and emitter of the switching transistor 3 which capacitor is a capacitor in a snubber circuit which is constituted by a resistor and the capacitor connected in series with one another. The resistor in the snubber circuit is omitted from the figure. The snubber circuit serves to absorb the spike voltage which is developed when the switching transistor 3 is turned off and thereby to protect the switching transistor 3.

Figure 9:
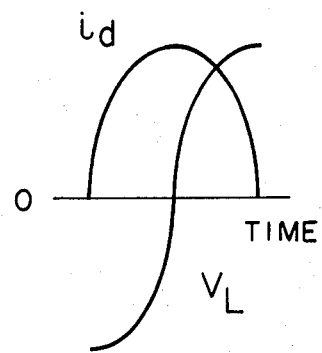

A reset circuit (not shown) for the transformer 2 is designed in a manner such that a voltage which is almost twice the voltage E of the power supply 1 is generally applied to the transistor 3 when the switching transistor 3 is being turned off. FIG. 9 is a diagram showing a discharge current $i_d$ of the capacitor 50 when the transistor 3 is turned off and a voltage $v_L$ which is generated in the exciting inductance $L_{ex}$. In the figure, the abscissa indicates a time. When the switching transistor 3 is turned off, the capacitor 50 is also charged to the voltage which is twice the power supply voltage E.

After the end of reset of the transformer 2, the voltage applied to the transistor 3 drops to the power supply voltage E. At this time, the capacitor 50 allows the discharge current $i_d$ to flow through the exciting inductance $L_{ex}$. The current $i_d$ becomes the resonance current among the capacitor 50, $L_{ex}$ and $L_{n1}$ and the relation between the $i_d$ and the voltage $v_L$ flowing through and developed across the $L_{ex}$ is as shown in FIG. 9. The voltage across $L_{ex}$ is represented in the manner that the dotted end shown in FIG. 6 corresponds to the positive polarity. As the discharge current $i_d$ starts decreasing, the voltage $v_L$ is generated in the voltage direction in which the dot is the positive polarity. This voltage $v_L$ is applied to the saturable reactor 5. Therefore, the saturable reactor 5 serves to block not only the voltage which is induced in the secondary winding of the transformer 2 when the transistor 3 is turned on but also the voltage $v_L$ of $L_{ex}$ which is generated due to the resonance current of the capacitor 50, so that the magnetic flux density varies at the frequency which is twice the operating frequency of the switching transistor.

Figure 10:
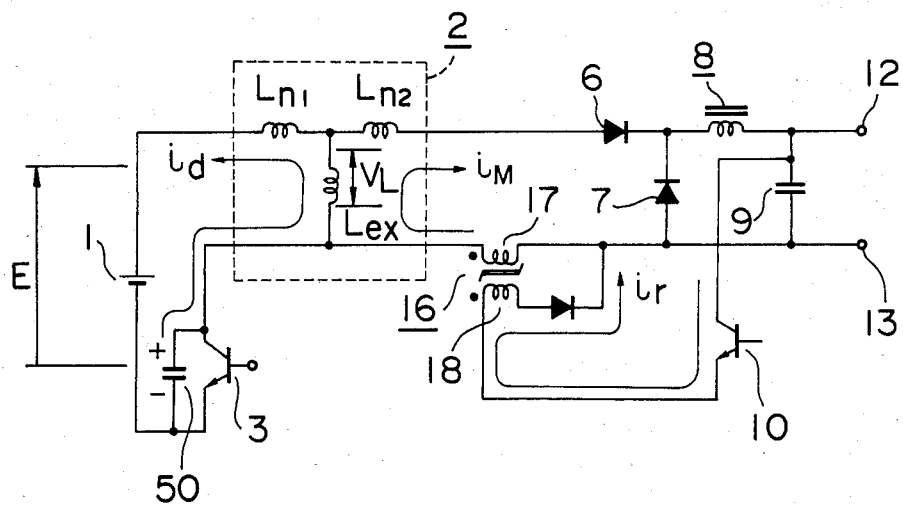
Figure 11:
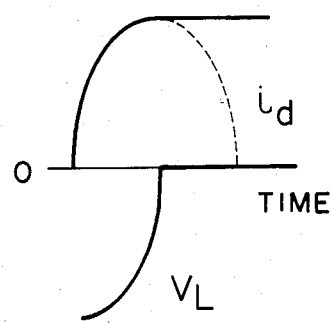

FIG. 10 shows the regulator in the embodiment of FIG. 6 in which the transformer 2 is shown as the equivalent circuit. FIG. 11 is a diagram showing the discharge current $i_d$ of the capacitor 50 when the transistor 3 is turned off and the voltage $V_L$ which is generated in the exciting inductance $L_{ex}$ in the embodiment of FIG. 6. In FIG. 11, the abscissa denotes time.

In the embodiment of FIG. 6, the reset winding 18 is provided in order to reset the reactor 16 and the reset circuit $i_r$ flows through the winding 18 during the OFF-state interval of the transistor 3, so that the voltage in the voltage direction in which the dot is the positive polarity is developed in the winding 18. Thus, as shown in FIG. 11, as the discharge current of the capacitor 50 starts decreasing, it is possible to allow a current $i_M$ to flow from the winding 17 of the reactor 16 in order to supplement such a decrease in discharge current. Therefore, the relation between the current $i_d$ flowing through the exciting inductance $L_{ex}$ and the voltage $v_L$ which is developed across the $L_{ex}$ is as shown in FIG. 11. It will be understood that even if the discharge current of the capacitor 50 starts decreasing (indicated by a dotted line), no voltage is generated in $L_{ex}$, so that the loss of power in the saturable reactor 16 is not caused.

According to the above-mentioned embodiment, the reactor can be magnetized so as to be reset by a sufficiently high voltage whereby the reset current is allowed to flow through another winding provided separately in the saturable reactor; therefore, there are advantageous effects that the output control can be performed with a high degree of accuracy within a wide range from the maximum output condition to the loadless condition and the increase in temperature of each of the transformer and saturable reactor can be made small.

Next, another embodiment of the present invention will be explained with reference to FIGS. 12 and 13.

Figure 12:
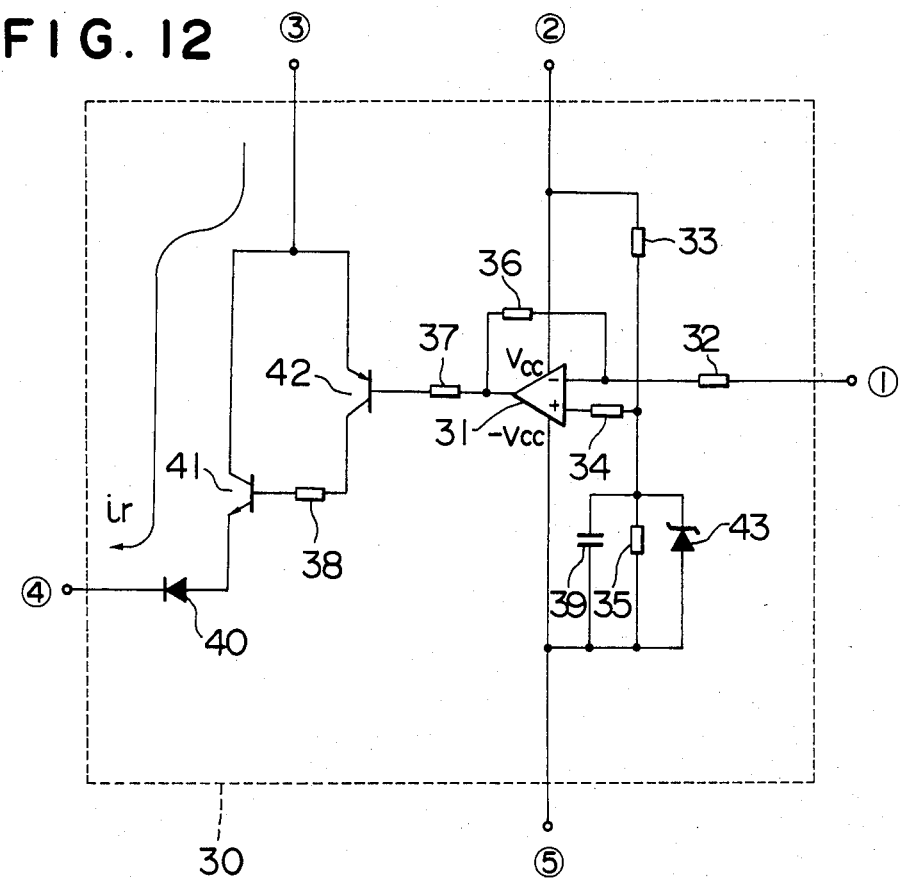
FIG. 12 is a diagram showing an example of a reset control circuit which can be used to all of the embodiments of the invention.

FIG. 12 is a diagram showing a current 30 which is the specific example of the reset control circuit 11 shown in FIG. 6 including the control transistor 10 and diode 15.

Figure 13:
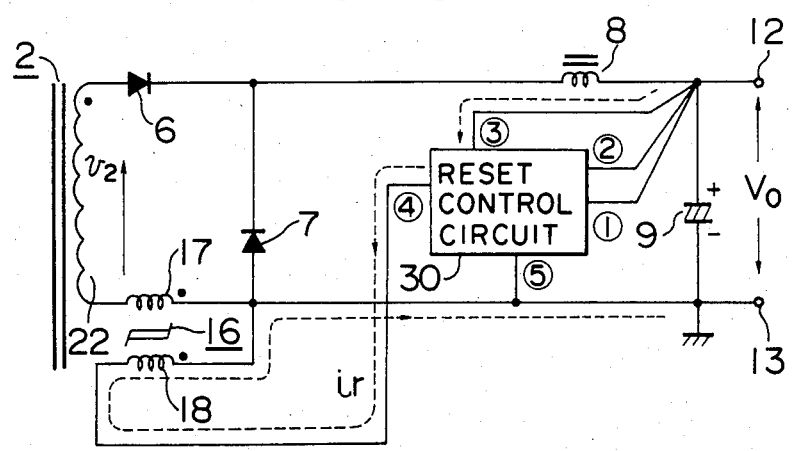
FIG. 13 shows an embodiment in which a reset control circuit of FIG. 12 is used in the embodiment of FIG. 6.

FIG. 13 shows an embodiment of the present invention in which the embodiment of FIG. 6 is constituted using the reset control circuit of FIG. 12.

In FIG. 12, $V_{cc}$ of a linear amplifier 31 is connected to a terminal ② and $-V_{cc}$ is connected to a terminal ⑤. A terminal ① is connected to an inverting input of the linear amplifier 31 through a resistor 32. One end of a resistor 33 is connected to $V_{cc}$ and the other end is connected to a non-inverting input of the linear amplifier 31 through a resistor 34, respectively. Each end of a resistor 35 and a capacitor 39, a cathode of a Zener diode 43, and a node of the resistors 33 and 34 are connected to each other. Each of the other ends of the resistor 35 and capacitor 39 and an anode of the Zener diode 43 are connected to $-V_{cc}$. A resistor 36 is connected between the inverting input of the linear amplifier 31 and an output thereof. The output of the linear amplifier is further connected to a base of a transistor 42 through a resistor 37. An emitter of the transistor 42 is connected to a terminal ③ and a collector is connected to a base of a transistor 41 through a resistor 38, respectively. A collector of the transistor 41 is connected to the terminal ③ and an emitter is connected to a terminal ④ through a diode 40, respectively.

In operation, a reference voltage which is generated by a reference voltage generator that is constituted by the resistors 33 and 35, capacitor 39 and Zener diode 43 is compared with a detection signal $v_s$ indicative of the output voltage $V_0$ which is inputted to the terminal ①, so that an output of the linear amplifier 31 which output is determined by the difference amplified with a gain $R_{36}/R_{34}$ is generated from the linear amplifier 31. $R_{34}$ and $R_{36}$ are resistance values of the resistors 34 and 36, respectively. The transistors 41 and 42 control the current flowing from the terminal ③ to ④ on the basis of the output of the linear amplifier 31. The terminals ② and ⑤ are used to connect a power supply necessary for operating the reset control circuit 30.

In the control circuit 30 in FIG. 13, the terminals ① and ② are together connected to the positive polarity terminal of the capacitor 9 in the smoothing circuit and the terminal ⑤ is connected to the negative polarity terminal of the capacitor 9, respectively, thereby allowing the control circuit 30 to be made operative by the output voltage $V_0$. The terminal ③ is connected to the positive polarity terminal of the capacitor 9 and the terminal ④ is connected to one end of the second winding 18 of the saturable reactor 16. The other end (the dotted end) of the second winding 18 is connected to the negative polarity terminal of the capacitor 9. The reset current $i_r$ flowing through the second winding 18 of the saturable reactor 16 is controlled in accordance with the difference between the reference voltage from the reference voltage generator in the control circuit 30 and the detection voltage $v_s$, thereby allowing the output voltage $V_0$ to be regulated. The reset current $i_r$ flows along the path indicated by a broken line in the diagram.

As described above, in the embodiments of FIGS. 6 and 13, the saturable reactor and transformer can be completely reset by a simple arrangement wherein another winding is separately provided in the saturable reactor; therefore, it is possible to design the transformer using the core of the same volume as that in the transformer of the ordinary switching regulator. Furthermore, since there is no need to reduce the transient response characteristic of the control circuit, the control accuracy can be improved in accordance with the requirements and specifications of the power supply. A problem of breakage of the switching transistor when the load is suddenly changed is not caused.

Figure 14:
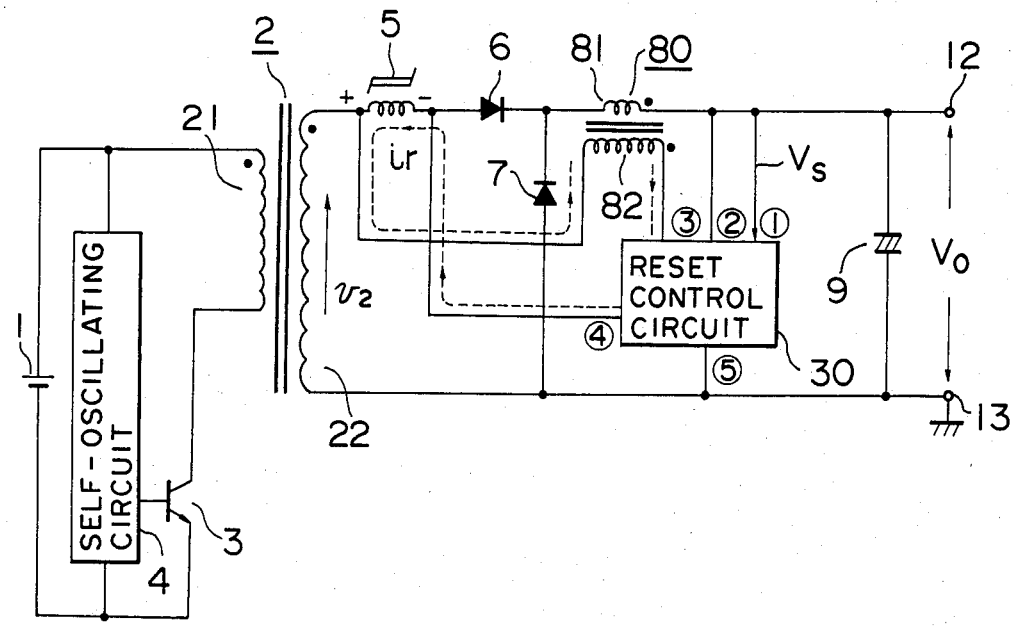
FIG. 14 is a circuit diagram showing still another embodiment of the invention.

FIG. 14 shows another embodiment of the present invention. In the diagram, the dotted end of the secondary winding 22 of the transformer 2 is connected through the saturable reactor 5 to the anode of one diode 6 constituting a rectifier. A choke coil 80 is constituted by a first winding 81 to supply the electric power, namely, to allow the output current of the regulator to flow and a second winding 82 which is magnetically coupled to the first winding 81. One end of the first winding is connected to the cathode of the diode 6 and the other end (the dotted end) is connected to the positive polarity output terminal 12. One end of the second winding 82 is connected to a connecting point of the dotted end of the secondary winding 22 of the transformer 2 and the reactor 5, while the other end (the dotted end) is connected to a connecting point of the reactor 5 and the cathode of the diode 6 through the terminals ③ and ④ of the reset control circuit 30. The terminals ① and ② of the reset control circuit 30 are connected to the positive polarity terminal of the capacitor 9 and the terminal ⑤ is connected to the negative polarity terminal thereof, respectively. The cathode of another diode 7 constituting the rectifier is connected to the cathode of the diode 6, while the anode thereof is connected to the negative polarity terminal of the capacitor 9. The reset control circuit 30 is the same as that in FIG. 12.

In operation, when the transistor 3 is turned off, a voltage is induced in the secondary winding 22, the undotted end of which is positive, of the transformer 2.

However, it is blocked by the diode 6 and the energy stored in the choke coil 80 is discharged to the capacitor 9 through the diode 7.

At this time, the output voltage $V_0$ in the voltage direction of which is that the dotted end of the first winding 81 in the figure is positive is applied to the first winding 81 of the choke coil 80, so that the voltage of $$V_0 \times \frac{n_{L2}}{n_{L1}}$$

in the voltage direction of which that the dotted end of the second winding 82 is positive is similarly induced in the second winding 82. $n_{L1}$ and $n_{L2}$ respectively denote the numbers of turns of the first winding 81 and of the second winding 82. Since the saturable reactor 5 is magnetized so as to be reset by the voltage induced in the second winding, by selecting the turn ratio such that the voltage value is equal to nearly $v_2$- $V_0$, the saturable reactor 5 can be completely reset within the turn-off interval even when the transistor 3 operates at the maximum on-duty ratio of (about) 50%.

When the transistor 3 is turned on, the voltage having the polarity shown in the figure is developed across the saturable reactor 5 for only a predetermined interval determined by the reset current $i_r$ by which the saturable reactor 5 was controlled and the voltage $v_2$ is blocked, accordingly. This operation is the same as that in the foregoing embodiments.

In this embodiment, the reset current $i_r$ flows to the reactor 5 through control elements such as a transistor and the like in the reset control circuit 30 along the path indicated by a broken line in the drawing due to the voltage induced in the second winding 82 of the choke coil 80. Therefore, the reset current $i_r$ flows without passing through the secondary winding 22 of the transformer 2, so that the power loss in the transformer can be reduced and the transformer can be miniaturized.

Further, even if a large reset current flows due to sudden change of the load or the like, this current has nothing to do with the saturation of the transformer as in the conventional example. Thus, the transient response characteristic of the reset control circuit 30 can be set to be sufficiently high.

The choke coil 80 is generally of the shell type using a ferrite core, so that the first and second windings 81 and 82 can be wound on the same bobbin. Although the number of turns of the winding 82 is two to five times larger than that of the winding 81, the amplitude of the reset current $i_r$ is so small to be of the order of tens to hundreds milliamperes (mA); therefore, the winding 82 can be formed by thin magnet wires and good magnetic coupling can be derived.

Figure 15:
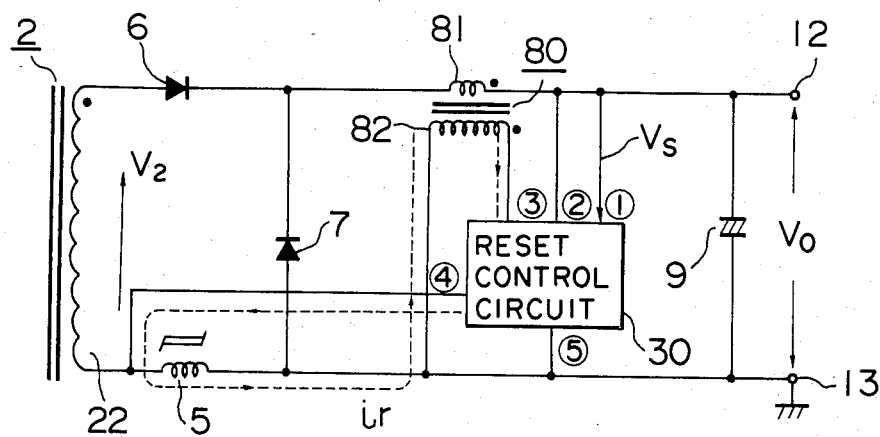
FIG. 15 is a diagram showing still another embodiment of the invention.

FIG. 15 shows still another embodiment. Since the circuit on the primary side of the transformer 2 is similar to that in each of the other embodiments, it is omitted. This embodiment is different from the embodiment of FIG. 14 mainly with regard to the point such that the saturable reactor 5 is provided between the undotted end of the secondary winding 22 of the transformer 2 and the negative polarity output terminal 13. The choke coil 80 is the same as that in the embodiment of FIG. 14. The dotted end of the second winding 82 of the choke coil 80 is connected to a connecting point of the undotted end of the secondary winding 22 and one end of the saturable reactor 5 through the terminals ③ and ④ of the reset control circuit 30. The other end of the second winding is connected to the negative polarity output terminal 13.

In this embodiment as well, the reset current $i_r$ of the saturable reactor is derived from the second winding 82 of the choke coil 80 similarly to that in FIG. 14. The path along which the reset current $i_r$ flows is the same as that in the embodiment of FIG. 14. Namely, the reset current $i_r$ flows along the path indicated by a broken line in the figure and does not flow through the winding of the transformer, so that a similar effect is obtained.

In this connection, since one end of the saturable reactor 5 is fixed to the negative polarity side of the output, an effect such that generation of the noise due to the floating of the potential can be suppressed is obtained.

Figure 16:
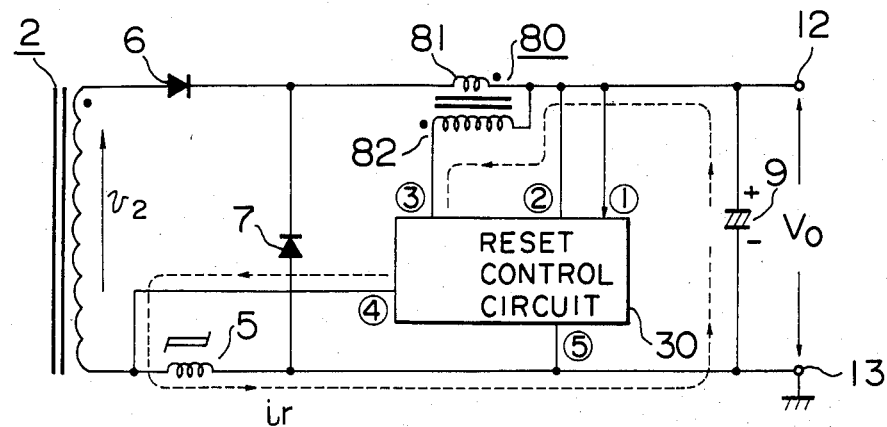
FIG. 16 is a circuit diagram showing still another embodiment of the invention.

FIG. 16 shows still another embodiment. This embodiment is different from FIG. 15 with respect to the following point. That is, one end (the undotted end) of the second winding 82 of the choke coil 80 is connected to the positive polarity side of the output $V_0$, while the other end (the dotted end) is connected to the saturable reactor 5 through the terminals ③ and ④ of the reset control circuit 30.

In this embodiment, the reset current $i_r$ flows due to both of the voltage induced in the second winding 82 and the output voltage $V_0$ as indicated by a broken line in the figure, so that it is possible to derive an advantageous effect such that the number of turns of the winding 82 can be reduced by numbers commensurate with the voltage of $V_0$ as compared with the foregoing embodiment.

Furthermore, in the smoothing circuit of the choke input type, a dummy resistor (not shown) is generally arranged to the output end to prevent the current from discontinuously flowing through the choke coil. However, in the apparatus having a high output voltage, the power loss due to the dummy resistor obstructs the improvement in efficiency.

In this embodiment, even if the current to the choke coil 80 is repeatedly cut off for a short time when no load or light load is applied (namely, even if it discontinuously flows), the reset current $i_r$ can be allowed to flow due to the voltage source of $V_0$, so that there is an advantageous effect such that the value of the dummy resistor is enlarged and the voltage loss can be reduced.

Figure 17:
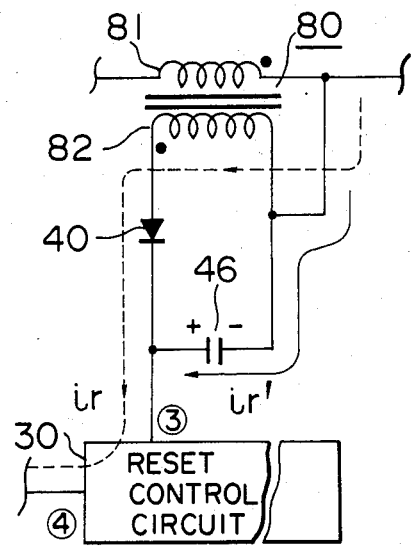
FIG. 17 is a circuit diagram showing the modified portion of the embodiment of FIG. 16.

In this embodiment, a diode 40 and a capacitor 46 in the circuit arrangement shown in FIG. 17 can be added. In the figure, the diode 40 is connected between the dotted end of the second winding 82 and the terminal ③ of the reset control circuit 30 in a manner that the cathode of the diode 40 is located on the terminal ③ side and the anode is located on the dotted end of the second winding 82. The capacitor is connected between the undotted end of the second winding 82 and the cathode of the diode 40.

Since the capacitor 46 is charged due to the voltage of the second winding 82 during the turn-off interval of the switching transistor 3 so as to have the polarity shown in the drawing, a current $i_r'$ can be also allowed to flow due to the voltage $V_0$ and the terminal voltage of the capacitor 46 even after the current to the first winding 81 discontinuously flowed (indicated by a solid line in the drawing). Owing to this, the voltage loss by the dummy resistor can be further effectively reduced.

As described above, according to the embodiment shown in FIGS. 14 to 17, the saturable reactor can be reset by the sufficiently high voltage which is induced in another winding provided separately in the choke coil for smoothing the output. Therefore, there is an effect such that the output can be stably controlled within a wide load range from no load or light load to the maximum output load. In addition, the power loss in the transformer can be reduced and the transformer can be miniaturized. Further, the reset current of the saturable reactor does not affect the transformer, so that the transient response characteristic of the control circuit is set to be sufficiently high and the accurate output voltage is derived.

In each embodiment of FIGS. 6 and 13 to 17, the power supply having a single output is shown. However, in the case of a power supply having multiple outputs, if each output is constituted by the circuit of the present invention, each output can be individually controlled. In the foregoing embodiments, the self-oscillating circuit is used as the control circuit on the primary side. However, the invention can be obviously applied to a switching power supply which is controlled by a fixed clock pulse. Further, in the power supply controlled by a fixed clock pulse and having multiple outputs only one of which is controlled in a pulse width modulation fashion, the present invention can be also applied to the other unregulated outputs.

As described above, according to the present invention, the saturable reactor or choke coil of the smoothing circuit is mainly constituted so as to have the first and second windings, thereby enabling the saturable reactor to be reset irrespective of the transformer. Therefore, the incomplete resetting of the transformer in the conventional magnetically controlled switching regulator can be solved. Owing to this, the problems such as the breakage of the switching transistor at the time of sudden load change and the increase in temperature of the transformer are solved, and at the same time the core of the transformer can be miniaturized. In addition, the gain and transient response characteristic of the reset control circuit are sufficiently raised and the output voltage can be controlled with high accuracy. In addition, in some embodiments, the increase in temperature of the saturable reactor can be remarkably reduced, so that there is an advantageous effect such that the heat radiating fin of the reactor can be miniaturized as compared with those used in the conventional magnetically controlled switching regulator.

We claim:

1. A magnetically controlled switching regulator comprising:

a transformer having a primary winding to be connected to an unregulated DC power supply and a secondary winding;

switching means, connected in series with said primary winding, for alternately and repeatedly connecting and disconnected said primary winding to supply a pulse voltage train to said primary winding;

means, connected to one end of said secondary winding, for rectifying an output pulse voltage of said transformer;

an L-C filter including a choke coil and a capacitor, connected to an output of said rectifying means, for smoothing said rectified output pulse voltage;

a first output terminal connected to an output of said L-C filter and a second output terminal connected to both the other end of said secondary winding and said L-C filter, an output voltage of said switching regulator being generated across said first and second output terminals;

a saturable reactor whose winding is connected in series with said secondary winding, said saturable reactor controlling the pulse width of said output pulse voltage to be supplied to said rectifying means, and said L-C filter and said reactor being constituted so as to reset said reactor by a high voltage using only the energy stored in said L-C filter; and control means, connected to said L-C filter and said reactor, for controlling the resetting of said reactor to regulate said output voltage;

wherein said L-C filter and said reactor are constituted so as to reset said reactor by the energy stored in said capacitor; said transformer is constituted such that the polarity of the voltage which is induced in said secondary winding when said pulse voltage is supplied becomes positive at said one end of said secondary winding and becomes negative at said other end thereof; said capacitor is connected in parallel to said first and second output terminals; and said reactor includes a first winding connected between said other end of said secondary winding and said second output terminal for passing an output current of said switching regulator therethrough and a second winding magnetically coupled to said first winding, said second winding being connected across said capacitor through said reset control means.

2. A magnetically controlled switching regulator according to claim 1, wherein said rectifying means includes first and second diodes whose cathodes are commonly connected; an anode of said first diode is connected to said one end of said secondary winding; one end of said choke coil is connected to a connecting point of said common cathodes and the other end thereof is connected to said first output terminal, respectively; one end of said capacitor is connected to said other end of the choke coil and the other end thereof is connected to both said second output terminal and an anode of said second diode, respectively; a first end of said first winding is connected to said other end of said secondary winding and a second end is connected to said second output terminal, respectively; a first end of said second winding is connected to said one end of said capacitor through said reset control means and a second end of said second winding is connected to said other end of the capacitor, respectively; and said reactor is constituted such that both of said first ends of said first and second windings have the same polarity.

3. A magnetically controlled switching regulator according to claim 4, wherein a ratio between the number $n_{M1}$ of turns of said first winding and the number $n_{M2}$ of turns of said second winding is determined by the following equation:

$$V_0 \times \frac{n_{M1}}{n_{M2}} \simeq v_2 - V_0$$

where, $V_0$ is a value of said output voltage and $v_2$ is a value of the output pulse voltage of said transformer.

4. A magnetically controlled switching regulator according to claim 3, wherein said rectifying means includes first and second diodes whose cathodes are commonly connected; an anode of said first diode is connected to said one end of said secondary winding; one end of said choke coil is connected to a connecting point of said common cathodes and the other end thereof is connected to said first output terminal, respectively; one end of said capacitor is connected to said other end of the choke coil and the other end thereof is connected to both said second output terminal and an anode of said second diode, respectively; a first end of said first winding is connected to said other end of said secondary winding and a second end is connected to said second output terminal, respectively; a first end of said second winding is connected to said one end of said capacitor through said reset control means and a second end of said second winding is connected to said other end of the capacitor, respectively; and said reactor is constituted such that both of said first ends of said first and second windings have the same polarity.

5. A magnetically controlled switching regulator according to claim 4, wherein said reset control means includes means for generating a reference voltage, comparing means for comparing said reference voltage with said output voltage and generating a control signal responsive to the difference therebetween and means for controlling a current on the basis of said control signal; said current control means is connected between said one end of said capacitor and said first end of said second winding; and a reset current flowing through the second winding is controlled on the basis of the difference between said output voltage and said reference voltage.

6. A magnetically controlled switching regulator according to claim 5, wherein said current control means includes transistor; an emitter and a collector of said transistor are connected between said one end of said capacitor and said first end of said second winding through a diode; and a base of said transistor is connected to an output of said comparing means.

7. A magnetically controlled switching regulator comprising:
a transformer having a primary winding to be connected to an unregulated DC power supply and a secondary winding;
switching means, connected in series with said primary winding, for alternately and repeatedly connecting and disconnecting said primary winding to supply a pulse voltage train to said primary winding;
means, connected to one end of said secondary winding, for rectifying an output pulse voltage of said transformer;
an L-C filter including a choke coil and a capacitor, connected to an output of said rectifying means, for smoothing said rectified output pulse voltage;
a first output terminal connected to an output of said L-C filter and a second output terminal connected to both the other end of said secondary winding and said L-C filter, an output voltage of said switching regulator being generated across said first and second output terminals;
a saturable reactor whose winding is connected in series with said secondary winding, said saturable reactor controlling the pulse width of said output pulse voltage to be supplied to said rectifying means, and said L-C filter and said reactor being constituted so as to reset said reactor by a high voltage using only the energy stored in said L-C filter; and
control means, connected to said L-C filter and said reactor, for controlling the resetting of said reactor to regulate said output voltage;

wherein said L-C filter and said reactor are constituted so as to reset said reactor by the energy stored in said choke coil; said choke coil includes a first winding connected between the output of said rectifying means and said first output terminal for allowing an output current of said regulator to flow and a second winding magnetically coupled to said first winding, said second winding being connected across said reactor through said reset control means.

8. A magnetically controlled switching regulator according to claim 7, wherein a ratio between the number $n_{L1}$ of turns of said first winding and the number $n_{L2}$ of turns of said second winding is determined by the following equation;

$$V_0 \times \frac{n_{L2}}{n_{L1}} \simeq v_2 - V_0$$

where, $V_0$ is a value of said output voltage and $v_2$ is a value of said output pulse voltage of said transformer.

9. A magnetically controlled switching regulator according to claim 8, wherein said transformer is constituted such that the polarity of the voltage which is induced in said secondary winding when said pulse voltage is supplied becomes positive at said one end of the secondary winding and becomes negative at said other end thereof, and said reactor is connected between said other end of said secondary winding and said second output terminal.

10. A magnetically controlled switching regulator according to claim 9, wherein said rectifying means includes first and second diodes whose cathodes are commonly connected; an anode of said first diode is connected to said one end of said secondary winding; a first end of said first winding is connected to said common cathodes and a second end thereof is connected to said first output terminal, respectively; one end of said capacitor is connected to said second end of said first winding and the other end is connected to both an anode of said second diode and said second output terminal; a first end of said reactor is connected to said other end of said secondary winding and a second end thereof is connected to said second output terminal; and a first end of said second winding is connected to a second end of said reactor and a second end thereof is connected to said first end of the reactor through said reset control means, respectively.

11. A magnetically controlled switching regulator according to claim 10, wherein said reset control means includes means for generating a reference voltage, comparing means for comparing said reference voltage with said output voltage and generating a control signal responsive to the difference therebetween, and control means for controlling a current on the basis of said control signal; said current control means is connected in series between said second end of said second winding and said first end of said reactor; and said current flowing through the reactor is controlled on the basis of said difference.

12. A magnetically controlled switching regulator according to claim 8, wherein said transformer is constituted such that the polarity of the voltage which is induced in said secondary winding when said pulse voltage is supplied becomes positive at said one end of the secondary winding and becomes negative at said other end thereof, and said reactor is connected between said one end of said secondary winding and said rectifying means.

13. A magnetically controlled switching regulator according to claim 15, wherein said rectifying means includes first and second diodes whose cathodes are commonly connected; a first end of said reactor is connected to said one end of said secondary winding and a second end thereof is connected to an anode of said first diode, respectively; a first end of said first winding is connected to the connecting point of said cathodes and a second end thereof is connected to said first output terminal, respectively; a first end of said second winding is connected to said first end of said reactor and a second end thereof is connected to said second end of the reactor through said reset control means, respectively; an anode of said second diode is connected to said second output terminal; and said capacitor is connected in parallel to said first and second output terminals.

14. A magnetically controlled switching regulator according to claim 13, wherein said reset control means includes means for generating a reference voltage, comparing means for comparing said reference voltage with said output voltage and generating a control signal responsive to the difference therebetween, and control means for controlling a current on the basis of said control signal; said current control means is connected in series between said second end of said second winding and said first end of said reactor; and said current flowing through the reactor is controlled on the basis of said difference.

15. A magnetically controlled switching regulator comprising:
a transformer having a primary winding to be connected to an unregulated DC power supply and a secondary winding;
switching means, connected in series with said primary winding, for alternately and repeatedly connecting and disconnecting said primary winding to supply a pulse voltage train to said primary winding;
means, connected to one end of said secondary winding, for rectifying an output pulse voltage of said transformer;
an L-C filter including a choke coil and a capacitor, connected to an output of said rectifying means, for smoothing said rectified output pulse voltage;
a first output terminal connected to an output of said L-C filter and a second output terminal connected to both the other end of said secondary winding and said L-C filter, an output voltage of said switching regulator being generated across said first and second output terminals;
a saturable reactor whose winding is connected in series with said secondary winding, said saturable reactor controlling the pulse width of said output pulse voltage to be supplied to said rectifying means, and said L-C filter and said reactor being constituted so as to reset said reactor by a high voltage using only the energy stored in said L-C filters; and
control means, connected to said L-C filter and said reactor, for controlling the resetting of said reactor to regulate said output voltage;
wherein said L-C filter and said reactor are constituted so as to reset the reactor by the energy stored in said choke coil and capacitor; said capacitor is connected in parallel between said first and second output terminals; said choke coil includes a first winding connected between the output of said rectifying means and said first output terminal and for allowing an output current of said regulator to flow therethrough and a second winding magnetically coupled to said first winding; and said second winding, said capacitor and said reactor are connected in series through said reset control means.

16. A magnetically controlled switching regulator according to claim 15, wherein said transformer is constituted such that the polarity of the voltage induced in said secondary winding when said pulse voltage is supplied becomes positive at said one end of the secondary winding and becomes negative at said other end thereof, and said reactor is connected between said other end of the secondary winding and said second output terminal.

17. A magnetically controlled switching regulator according to claim 16, wherein said rectifying means includes first and second diodes whose cathodes are commonly connected; an anode of said first diode is connected to said first end of said secondary winding; a first end of said first winding is connected to the connecting point of said cathodes and a second end thereof is connected to said first output terminal, respectively; a first end of said reactor is connected to said other end of said secondary winding and a second end thereof is connected to said second output terminal, respectively; a first end of said second winding is connected to said first end of said reactor through said reset control means and a second end thereof is connected to said first output terminal, respectively; and said choke coil is constituted such that both of the second end of said first winding and the first end of said second winding have the same polarity.

18. A magnetically controlled switching regulator according to claim 17, wherein said reset control means includes means for generating a reference voltage, comparing means for comparing said reference voltage with said output voltage and generating a control signal responsive to the difference therebetween, and control means for controlling a current on the basis of said control signal; said current control means is connected between said first end of said second winding and said first end of said reactor; and a current flowing through said reactor is controlled on the basis of said control signal.

19. A magnetically controlled switching regulator according to claim 17, further including a diode which is connected between said first end of said second winding and said current control means such that a cathode of said diode is arranged on the side of the current control means, and a capacitor which is connected between said second end of said second winding and said cathode.

20. A magnetically controlled switching regulator comprising:
a transformer having a primary winding to be connected to an unregulated DC power supply and a secondary winding;
switching means, connected in series with said primary winding, for alternately and repeatedly connecting and disconnecting said primary winding to supply a pulse voltage train to said primary winding;
rectifying means, connected to one end of said secondary winding, for rectifying an output pulse voltage of said transformer;

an L-C filter including a choke coil and a capacitor, connected to an output of said rectifying means, for smoothing said rectified output pulse voltage;

a first output terminal connected to an output of said L-C filter and a second output terminal connected to both the other end of said secondary winding and said L-C filter, an output voltage of said switching regulator being generated across said first and second output terminals;

saturable reactor means including winding means connected in series with said secondary winding and arranged so that a reset current of said saturable reactor means does not flow through said secondary winding of said transformer, said saturable reactor means controlling the pulse width of said output pulse voltage to be supplied to said rectifying means; and control means for controlling the resetting of said saturable reactor means for regulating said output voltage of said switching regulator.

21. A magnetically controlled switching regulator according to claim 20, wherein said control means is connected to said L-C filter and said saturable reactor means.

22. A magnetically controlled switching regulator according to claim 21, whereih said L-C filter and said saturable reactor means are arranged so as to reset said saturable reactor means by the energy stored in said capacitor of said L-C filter.

23. A magnetically controlled switching regulator according to claim 21, wherein said L-C filter and said saturable reactor means are arranged so as to reset said saturable reactor means by the energy stored in said choke coil of said L-C filter.

24. A magnetically controlled switching regulator according to claim 21, wherein said L-C filter and said saturable reactor means are arranged so as to reset said saturable reactor means by the energy stored in said choke coil and said capacitor of said L-C filter.

25. A magnetically controlled switching regulator according to claim 20, wherein said winding means of said saturable reactor means includes a first winding connected in series with said secondary winding of said transformer, and a second winding magnetically coupled to said first winding, said second winding being connected so that the reset current of said saturable reactor means flows through said second winding.

* * * * *